July 3, 1934.  J. P. ROBERTS  1,965,470
CARBURETOR
Filed March 2, 1932  2 Sheets-Sheet 1
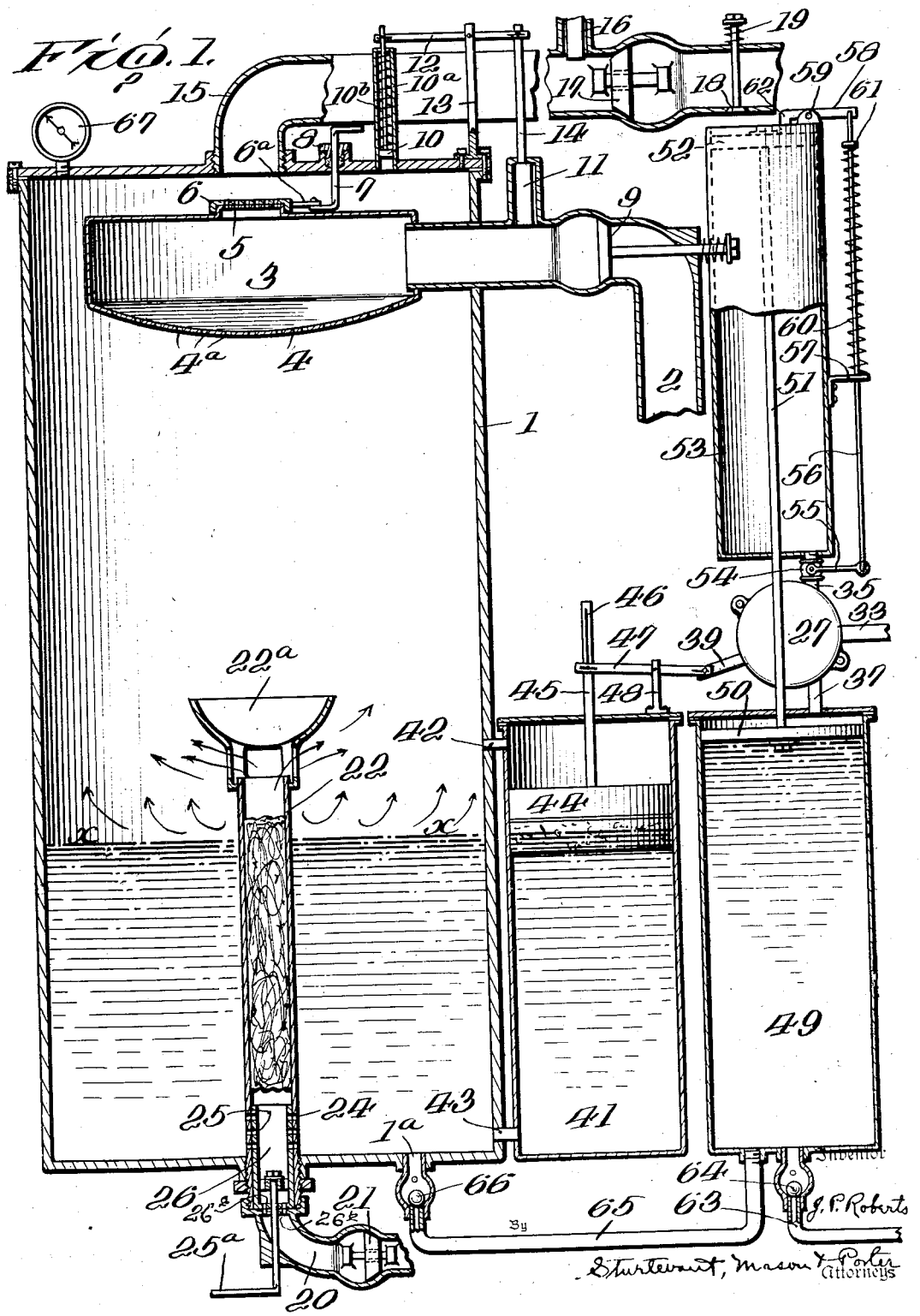

July 3, 1934.  J. P. ROBERTS  1,965,470
CARBURETOR
Filed March 2, 1932  2 Sheets-Sheet 2
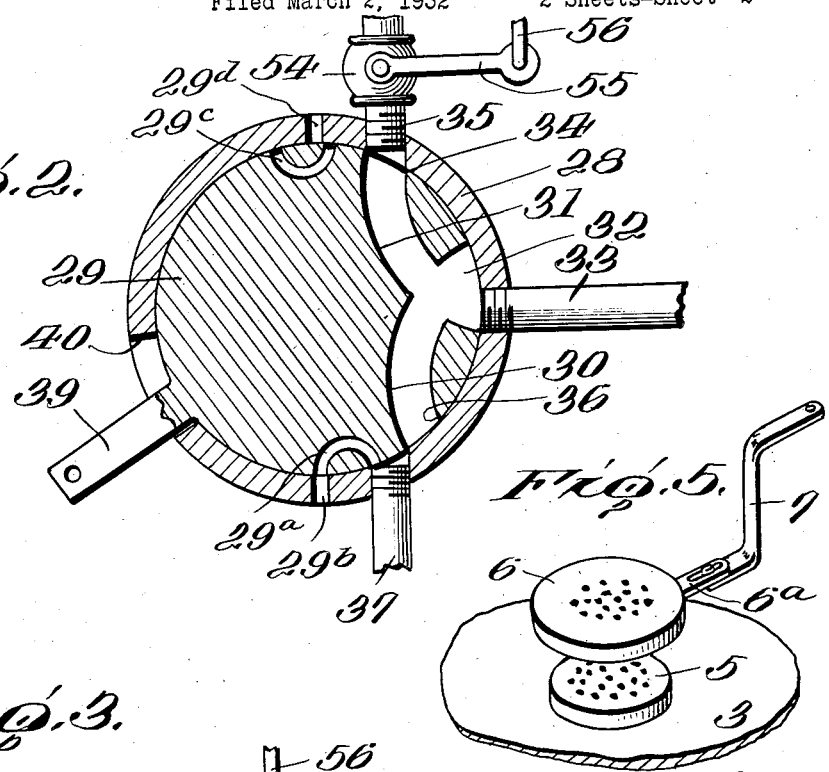
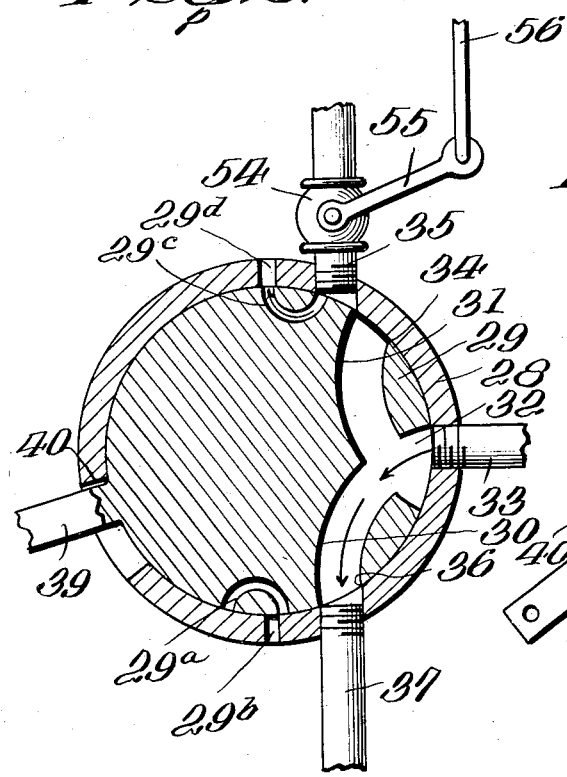
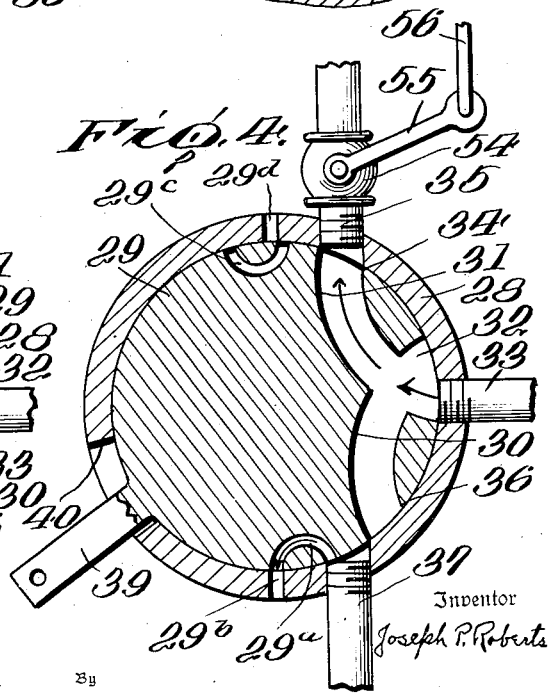
Inventor
Joseph P. Roberts
By Sturtevant, Mason & Porter
Attorneys Patented July 3, 1934

1,965,470

UNITED STATES PATENT OFFICE 1,965,470

CARBURETOR

Joseph P. Roberts, St. Petersburg, Fla., assignor of one-fifth to J. E. Bryan and one-fifth to William H. Schooley, both of St. Petersburg, Fla.

Application March 2, 1932, Serial No. 596,337

9 Claims. (Cl. 261—35)

The invention relates to new and useful improvements in a fuel charge forming apparatus for internal combustion engines, and more particularly an engine used in connection with automobiles and airplanes.

An object of the invention is to provide an apparatus whereby an explosive mixture is formed and supplied to the intake manifold of the engine in the form of a fueled air stream under pressure, first having passed over a body of volatile fuel under pressure whereby said air is charged with the vaporizing fuel.

A further object of the invention is to provide an apparatus of the above type, wherein the air stream is broken up into a series of air jets as it enters the chamber above the volatile fuel.

A still further object of the invention is to provide an apparatus of the above type with means for maintaining the volatile fuel between predetermined levels in the chamber so as to provide a space above these levels of the volatile fuel for the intermixing of the vaporizing fuel with the circulating air thereabove.

A still further object of the invention is to provide an apparatus of the above type with means whereby the formed mixture may be leaned by directing air into the mixture as it leaves the mixing chamber.

A still further object of the invention is to provide an apparatus of the above type, wherein means is provided for enriching the formed mixture by directing air through a baffling device charged with the volatile fuel.

These and other objects will in part be obvious and will in part be hereinafter more fully disclosed.

In the drawings:—

Figure 1 is a view in vertical section showing more or less diagrammatically one embodiment of an apparatus containing the invention.

Figure 2 is a sectional view through the main control valve for the means which supplies and maintains the volatile fuel between predetermined levels in the fuel charge forming chamber.

Figure 3 is a view showing more or less diagrammatically the control valve with the valve set for delivering a charge of volatile fuel to the fuel charge forming chamber.

Figure 4 is a view similar to Figure 3, but showing the valve set for drawing a charge of volatile fuel into the supply cylinder.

Figure 5 is a perspective view of the valve for controlling an air current into the fuel charge as it leaves the fuel charge forming chamber for leaning the mixture, when desired.

The invention is directed broadly to a fuel charge forming apparatus for internal combustion engines and includes a fuel charge forming chamber which is supplied with a volatile fuel. Means is also provided for supplying said chamber with the volatile fuel and for maintaining said fuel between predetermined levels. These fuel levels afford a space above the fuel in which the volatilizing fuel gathers. Means is also provided for directing an air stream through the fuel vapors above the level of the fuel body. The air is introduced into the chamber containing the volatile fuel under pressure, and is preferably broken into air jets so that the air is charged with the volatile fuel as it circulates in the chamber. The charged fuel passes from the chamber directly to the intake manifold of the engine. The pipe leading to the intake manifold is provided with a throttle valve, and is also provided with a check valve to prevent, in case of back fire, the exploded charge passing back into the fuel charge forming chamber. The air supply pipe is likewise provided with a valve controlled by the pressure developing on the fuel charge forming chamber, so that the pressure on the flowing air current may be maintained substantially constant. Means is also provided for directing air from the supply pipe directly into the discharge port leading from the fuel charge forming chamber for the purpose of leaning the mixture. Associated with the fuel charge forming chamber is also means for enriching the mixture which includes a baffle device preferably in the form of steel wool which is charged with the volatile fuel, and an air stream is passed through the baffling device and into the mixing chamber above the fuel level.

The invention will possibly be better understood by a detail description of the illustrated embodiment thereof. The apparatus includes a fuel charge forming tank or chamber 1 which is mounted in a suitable manner adjacent the intake manifold of the internal combustion engine. This chamber is supplied with a volatile fuel through an intake port 1a. A pipe 65 leads from this intake port 1a to a pump chamber 49. A check valve 66 is provided at the port 1a to prevent the fuel from passing out of the fuel charge forming chamber 1. A pipe 63 is connected to the lower end of the pump chamber 49 and a check valve 64 is provided so as to prevent the fuel fluid from passing back through the pipe 63. This pipe 63 leads to the usual supply tank. Located in this pump chamber 49 is a pump piston 50 carried by a piston rod 51. When the pump piston is raised it will draw the fuel into the pump chamber 49, and when it is lowered it will force the fuel into the fuel charge forming chamber 1.

Automatic means is provided for maintaining the supply of fuel in the fuel charge forming chamber 1 between predetermined levels. This is accomplished by a weighted float valve 44 located in an auxiliary chamber 41 connected to the fuel charge forming chamber by pipes 42 and 43. The volatile fuel will pass through the pipe 43 into this chamber 41 which is vented by the pipe 42 back into the chamber 1, so that the level in the auxiliary chamber 41 will be the same as the level of the volatile fuel in the chamber 1. This weighted float 44 serves to control the actuating means which moves the piston 50.

In the present embodiment of the invention air under pressure is used for operating the piston 50. Located above the pump chamber 49 is a cylinder 53 into which the piston rod 51 extends. At the upper end of the piston rod is a piston 52 which fits in the cylinder 53. The upper end of the cylinder is open to the atmosphere so that the piston 52 is free to move in an upward direction. A valve 27, shown more in detail in Figs. 2 to 4, is located between the pump chamber 49 and the cylinder 53. This valve 27 includes a casing 28 in which is located a valve 29. A pipe 37 leads from the casing 28 to the pump chamber 49 above the piston 50. A pipe 35 leads from the casing 28 to the cylinder 53. In this pipe 35 is a valve indicated at 54, the purpose of which will be referred to later. The casing 28 of the valve 27 is also connected to a pipe 33 which leads to a suitable apparatus for supplying air under pressure. This pressure may be, however, greater than atmospheric pressure, but it is desirable to have such pressure at least above the normal pressure of the intake manifold so that one air supplying means may be used for entire apparatus. The valve 29 is provided with a port 30, the end 36 of which may be brought into register with the opening leading to the pipe 37 as shown in Fig. 3 of the drawings. At this time the other end 32 of the port 30 is in register with the opening leading to the pipe 33. This connects the pipe 33 through the port 30 and pipe 37 with the pump chamber 49, and the air pressure against the upper side of the piston 50 will force the piston downward, and this in turn will force the volatile fuel through the pipe 65 into the fuel charge forming chamber.

The valve 29 is provided with a port 31 which is adapted to connect the pipe 33 with the cylinder 53. When the valve is shifted to the position shown in Fig. 4, then the end 34 of the port 31 is brought into register with the opening in the casing 28 to which the pipe 35 is connected. The opposite end of the port 31 connects with the end 32 of the port 30, and this opening 32 at the end of the ports 30 and 31 is always in register with the opening with which the pipe 33 is connected. When the valve is in the position shown in Figs. 2 and 4, then air from the pipe 33 is led into cylinder 53 and striking against the lower end of the piston 52, will raise said piston lifting the piston 50. When the piston 50 is raised it will create a vacuum in the pump chamber 49 and will draw in volatile fuel from the pipe 63, thus filling the pump chamber 49 with the volatile fuel. The valve 29 is provided with a port 29a which is in register with a vent opening 29b when the valve is in the position shown in Figs. 2 and 4. At this time the portion of the pump chamber 49 above the piston 50 is connected to the atmosphere, so that the piston 50 is free to move upward.

When the piston 52 reaches the upper end of the cylinder it engages a lever 62 pivoted at 59 to the cylinder 53. The outer end 58 of the lever is connected to a rod 56 which in turn is connected to an arm 55 attached to the valve 54. This rod 56 passes through a bracket 57. A spring 60 encircling the rod bears against the bracket 57 and a collar 61 fixed to the rod. This spring operates to raise the rod and hold the valve in open position, so that when the valve 29 is properly set air will pass through into the cylinder 53. When, however, the piston 52 reaches the upper end of the cylinder 53 it engages the lever 62 and will force the rod 56 downward so as to close the valve 54. When the pump chamber 49 is filled with the volatile fuel the air is cut off from both the cylinder 53 and the pump chamber 49 until the valve 29 is shifted. The valve 29 is connected to the weighted float 44. The float 44 is provided with a stem 45 having a slot 46 therein. A lever 47 is pivotally supported on a bracket 48 and carries a pin running in the slot 46. This lever is connected by a pin and slot connection to the arm 39 which is formed integral with the valve 29. This arm extends through a slot 40 in the valve casing 28. When the volatile fuel in the fuel charge forming chamber 1 drops to a predetermined lower level the float 44, moving down therewith, will cause the upper end of the slot 46 to engage the pin on the lever 47 and swing the lever to shift the valve 29 to the position shown in Fig. 3. This will connect the pipe 33 with the pump chamber 49 and force the piston 50 downward, thus supplying the fuel charge forming chamber with the volatile fuel. As the fuel flows into the chamber 1 it also flows into the auxiliary chamber 41 and will cause the float to rise. When the lower end of the slot 46 engages the pin on the lever 47 it will shift the lever and move the valve to the position shown in Fig. 4. This will cut off the air from the pump chamber 49, and regardless of the position of the piston 50 will stop further movement thereof. The shifting of the valve 29 also connects this pipe 33 with the cylinder 53 and this will at once cause the piston head 52 to move upward, lifting the piston 50 and filling the pump chamber 49 with volatile fuel preparatory to the again supplying of the fuel charge forming chamber with the volatile fuel when it has dropped to this predetermined level. The valve 29 has a port 29c which connects the pipe 35 to the port 29d and vents the cylinder 53 to the atmosphere permitting the free downward movement of the piston 52. As piston 52 moves away from lever 62 the spring 61 will open valve 54.

The broken line x—x in Fig. 1 of the drawings indicates the high level of the volatile fuel in the fuel charge forming chamber 1. It will be noted that there is a considerable space above this level of the fuel which will be constantly supplied with a vapor of the fuel as the fuel volatilizes. Located in the upper end of the fuel charge forming chamber 1 is an air distributing head 3, provided on its under face with a dome-shaped closure having a series of perforations 4a throughout the entire extent thereof. This distributor head 3 is connected to a pipe 2 leading to an apparatus for supplying air under pressure above the normal pressure pull of the intake manifold. This pressure may be below or above atmospheric pressure, but it is sufficient so that the mixture which is produced is conveyed under pressure into the intake manifold and not drawn therein by the vacuum pull usually employed. In this pipe 2 is a check valve 9 which prevents any backward flow of air into the pipe 2. Air passing into the distributing head will pass out through the perforations 4a in jets and will circulate in the space above the fuel level in the fuel charge forming chamber. This circulation of air currents will stir the volatile fuel at the surface thereof, aiding in the volatilization of the fuel. The air currents will be charged with the volatilized fuel and the fuel charged air passes out through the pipe 15 to the intake manifold of the engine.

In order to lean the mixture, the upper side of the distributor head 3 is provided with a perforated raised member 5 over which fits a perforated valve member 6. The valve 6 is provided with an arm 6a by which it may be rotated to bring the perforations into alinement. This permits air to pass from the distributor head through the lined ports directly into the pipe 15 and into the mixture as it passes through the pipe 15 to the intake manifold. The valve 6 is shifted by a control rod 7 passing through a stuffing box 8 in the upper wall of the fuel charge forming chamber 1. This control rod 7 is connected to any suitable means at the instrument board where it may be manipulated at will.

A pressure gage 67 is attached to the fuel charge forming chamber 1. In the air pipe 2 is a choke valve 11 for limiting the air supply through the pipe 2. The choke valve 11 is connected to a rod 14 which in turn is connected to a lever 12 mounted on a bracket 13. The lever 12 is connected to a rod 10a extending into a tube 10 attached to and communicating with the fuel charge forming chamber. At the lower end of the rod 10a is a piston and surrounding the rod is a spring 10b. The pressure within the fuel charge forming chamber operating on the piston will raise the rod 10a and lower the choke valve 11 so that when the pressure within the fuel charge forming chamber becomes excessive the valve will be lowered so as to reduce the volume of air supplied.

Located in the pipe 15 is a check valve 17 which freely opens to allow the mixture to pass to the intake manifold. In case of back fire the exploded gases passing back through the pipe 15 will close the valve 17 and will keep the exploded gases out of the fuel charge forming chamber 1. There is a throttle valve 16 in the pipe 15 which is connected by suitable means to the point on the dash so that the supply of fuel mixture to the intake manifold may be controlled. In case of back fire when the valve 17 closes, a valve 18 held closed by spring 19 is open to relieve the back pressure.

As a means for enriching the mixture when desired the fuel charge forming chamber 1 is provided with a standpipe 22 secured in any suitable way to the bottom wall of the fuel charge forming chamber 1. Located within this standpipe 22 is a sleeve 26. The pipe is provided with openings 24 and the sleeve with openings 25. The lower end of the sleeve 26 is closed by a perforated wall 26a cooperating with a perforated wall 26b in the air supply pipe 20 which is connected to the lower end of the standpipe 22. When all of these perforations are brought into alinement, fuel from the fuel charge mixing chamber is admitted to the standpipe 22, and air is also admitted to the standpipe. The sleeve 25 has attached thereto a control lever 25a, and this control lever is in turn connected to suitable devices at the instrument board so that it may be shifted at will. Thus air is supplied to the pipe 20 and passes up through the standpipe. The standpipe is provided with a baffle, preferably in the form of steel wool. The volatile fuel entering through the ports at the bottom of the standpipe, when the valve is in open position, will charge the steel wool with the volatile fuel, and the air passing up through the baffling device will be enriched with the vaporized fuel and will pass out around the distributing head 22a at the upper end of the standpipe into the chamber above the fuel level. This enriched fuel mixture will be thoroughly mixed with the air that is being charged with the vaporized fuel in the chamber above the fuel level, and thus the fuel supply to the engine greatly enriched. A check valve 21 is provided in the air pipe 20 to prevent any flow of the fuel mixture out of the charge forming chamber back into the air supplying apparatus.

It is thought that the operation of the fuel charge forming apparatus will be obvious from the detail description which has been given. The fuel charge forming chamber 1 is supplied with a volatile fuel and the charge is automatically maintained between certain fixed predetermined levels. Air is admitted to the chamber above the level of the volatile fuel, under pressure and circulating through the chamber becomes charged with the volatilized fuel and passes out through the pipe 15 to the intake manifold of the engine. The supply of the fuel mixture to the engine is under the control of the throttle valve 16. The pressure on the fuel charge forming chamber is controlled by the throttle valve 11 connected to the rod 10a which is moved only when said chamber is under excessive pressure. The air entering the fuel charge forming chamber is broken up into a series of fine jets which causes the air to circulate in the chamber, stirring the surface of the volatile fuel so as to aid in volatilization of the same. The charged air is caused to flow into the intake manifold through the pressure maintained on the air supplied and not through any vacuum pull of the intake manifold. This ensures a free and quick flow of the fuel mixture into the engine. By manipulating the valve 6 the air may be admitted directly into the mixture as it enters the pipe 16, and thus the mixture leaned. By manipulating the valve sleeve 25, an enriched mixture of air and fuel may be supplied to the forming mixture in the chamber above the fuel level, and thus the mixture supplied to the intake manifold greatly enriched.

It is obvious that the apparatus illustrated may be greatly varied as to structure and arrangement of parts without departing from the spirit of the invention as set forth in the appended claims.

Having thus described the invention, what I claim as new and desire to secure by Letters Patent, is:—

1. A fuel charge forming apparatus for internal combustion engines comprising a fuel charge forming chamber, means for supplying said chamber with a volatile fuel and maintaining in said chamber a fuel charge forming space above the surface of the volatile fuel, said fuel supplying means including an air pressure operated pump, means for operating said pump, a control valve for said air pressure means and a weighted float responsive to the level of the fuel in said chamber for operating said control valve, and means for directing air under pressure into said fuel charge forming space whereby the air is charged with the volatilized fuel therein and an explosive mixture formed, and means for delivering the explosive mixture to the intake manifold of the engine.

2. A fuel charge forming apparatus for internal combustion engines comprising a fuel charge forming chamber, means for supplying said chamber with a volatile fuel and maintaining in said chamber a fuel charge forming space above the surface of the volatile fuel, said fuel supplying means including an air pressure operated pump, means for operating said pump, a control valve for said air pressure means and a weighted float responsive to the level of the fuel in said chamber for operating said control valve, means for directing air under pressure into said fuel charge forming space whereby the air is charged with the volatilized fuel therein and an explosive mixture formed, means for delivering the explosive mixture to the intake manifold of the engine, said last named means including a throttle valve for controlling the supply of mixture, a back pressure valve for preventing back firing into the fuel charge forming chamber, and a relief valve between the pressure valve and the intake manifold.

3. A fuel charge forming apparatus for internal combustion engines comprising a fuel charge forming chamber, means for supplying said chamber with a volatile fuel, means for maintaining the maximum level of the fuel in the lower portion of said chamber whereby a fuel mixing space is provided above the surface of the volatile fuel, a distributing head located in the upper end of said chamber at a substantial distance from the fuel level therein and having a perforated under-face substantially conforming to the cross-sectional configuration of said chamber for directing air under pressure downwardly over substantially the entire surface of the fuel whereby the air is thoroughly mixed with the volatilized fuel and an explosive mixture is formed, means for delivering the explosive mixture to the intake manifold of the engine.

4. A fuel charge forming apparatus for internal combustion engines comprising a fuel charge forming chamber, means for supplying said chamber with a volatile fuel, means for maintaining the maximum level of the fuel in the lower portion of said chamber whereby a fuel mixing space is provided above the surface of the volatile fuel, a distributing head located in the upper end of said chamber at a substantial distance from the fuel level therein and having a perforated under-face substantially conforming to the cross-sectional configuration of said chamber for directing air under pressure downwardly over substantially the entire surface of the fuel whereby the air is thoroughly mixed with the volatilized fuel and an explosive mixture is formed, means for delivering the explosive mixture to the intake manifold of the engine and means automatically controlled by the pressure developing in the chamber for regulating the volume of air delivered to said chamber.

5. A fuel charge forming apparatus for internal combustion engines comprising a fuel charge forming chamber, means for supplying said chamber with a volatile fuel, means for maintaining the maximum level of the fuel in the lower portion of said chamber whereby a fuel mixing space is provided above the surface of the volatile fuel, a distributing head located centrally in said chamber at the upper portion thereof at a substantial distance from the fuel level therein and having a perforated wall at its lower face substantially conforming to the cross-sectional configuration of said chamber, means for directing air under pressure into said distributing head whereby said air flowing in jets downwardly into the mixing space and against the surface of the fuel is charged with the volatilized fuel and an explosive mixture formed, and means located directly above said distributing head for delivering the explosive to the intake manifold of the engine.

6. A fuel charge forming apparatus for internal combustion engines comprising a fuel charge forming chamber, means for supplying said chamber with a volatile fuel, means for maintaining the maximum level of the fuel in the lower portion of said chamber whereby a fuel mixing space is provided above the surface of the volatile fuel, a distributing head located centrally in said chamber at the upper portion thereof and having a perforated wall at its lower face, means for directing air under pressure into said distributing head whereby said air flowing in jets into the mixing space is charged with the volatilized fuel and an explosive mixture formed, means located directly above said distributing head for delivering the explosive to the intake manifold of the engine, said distributing head having an opening in its upper face directly in alignment with the means for delivering the explosive mixture to the engine and a manually operated valve for controlling the air passing from the distributing head through said opening.

7. A fuel charge forming apparatus for internal combustion engines comprising a fuel charge forming chamber, means for supplying said chamber with a volatile fuel, means for maintaining the maximum level of the fuel in the lower portion of said chamber whereby a fuel mixing space is provided above the surface of the volatile fuel, a distributing head located centrally in said chamber at the upper portion thereof and having a perforated wall in its lower face, means for directing air under pressure into said distributing head whereby said air flowing in jets into the mixing space is charged with the volatilized fuel and an explosive mixture formed, means located directly above said distributing head for delivering the explosive to the intake manifold of the engine, said distributing head having an opening in its upper face directly in alignment with the means for delivering the explosive mixture to the engine and a manually operated valve for controlling the air passing from the distributing head through said opening, and means automatically controlled by the pressure developing in said chamber for regulating the volume of air delivered to the distributing head.

8. A fuel charge forming apparatus for internal combustion engines comprising a fuel charge forming chamber, means for supplying said chamber with a volatile fuel, means for maintaining the maximum level of the fuel in the lower portion of said chamber whereby a fuel mixing space is provided above the surface of the volatile fuel, means located in the upper end of the chamber for directing air under pressure in a downward direction into the space above the volatile fuel whereby said air is mixed with the volatilized fuel and an explosive mixture formed, means for delivering the explosive mixture to the intake manifold of the engine, a pipe extending centrally through the volatile fuel in the chamber and carrying a distributing head above the level of the fuel, said pipe having openings leading thereto beneath the distributing head and openings below the surface of the volatile fuel through which fuel may pass into said pipe, means for controlling the last named openings and means for supplying air directly to said pipe whereby the air is enriched with the fuel and discharged into said mixing chamber.

9. A fuel charge forming apparatus for internal combustion engines comprising a fuel charge forming chamber, means for supplying said chamber with a volatile fuel, means for maintaining the maximum level of the fuel in the lower portion of said chamber whereby a fuel mixing space is provided above the surface of the volatile fuel, a distributing head located centrally in said chamber at the upper portion thereof and having a perforated wall in its lower face, means for directing air under pressure into said distributing head whereby said air flowing in jets into the mixing space is charged with the volatilized fuel and an explosive mixture formed, means located directly above said distributing head for delivering the explosive to the intake manifold of the engine, a pipe extending centrally through the volatile fuel in the chamber and carrying a distributing head above the level of the fuel, said pipe having openings leading thereto beneath the distributing head and openings below the surface of the volatile fuel through which fuel may pass into said pipe, means for controlling the last named openings and means for supplying air directly to said pipe whereby the air is enriched with the fuel and discharged into said mixing chamber.

JOSEPH P. ROBERTS.